US009623920B2

(12) United States Patent
Akinlua et al.

(10) Patent No.: US 9,623,920 B2
(45) Date of Patent: Apr. 18, 2017

(54) TRACK JOINT ASSEMBLIES

(71) Applicant: Caterpillar Inc., Peoria, IL (US)

(72) Inventors: Temitope Olayemi Akinlua, Peoria, IL (US); Mark Steven Diekevers, Germantown Hills, IL (US); Caroline Marie Brewer, Peoria, IL (US); Gregory Jerome Kaufmann, Metamora, IL (US); Timothy Arthur Thorson, Morton, IL (US); Kevin Lee Steiner, Tremont, IL (US); Robert Lee Meyer, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 68 days.

(21) Appl. No.: 14/461,289

(22) Filed: Aug. 15, 2014

(65) Prior Publication Data
US 2015/0061370 A1   Mar. 5, 2015

Related U.S. Application Data

(60) Provisional application No. 61/871,537, filed on Aug. 29, 2013.

(51) Int. Cl.
*F16F 1/34* (2006.01)
*B62D 55/088* (2006.01)
*B62D 55/21* (2006.01)

(52) U.S. Cl.
CPC ......... *B62D 55/0887* (2013.01); *B62D 55/21* (2013.01)

(58) Field of Classification Search
CPC  B62D 55/0887; B62D 55/202; B62D 55/092; B62D 55/08; B62D 55/21
(Continued)

(56) References Cited

U.S. PATENT DOCUMENTS 2,905,511 A   9/1959 Cerness
3,235,315 A   2/1966 Schnacke
(Continued)

FOREIGN PATENT DOCUMENTS

DE   3823571 A1   1/1990
EP   0101415      2/1984
(Continued)

OTHER PUBLICATIONS

U.S. Appl. No. 14/461,328 of Steiner et al., titled "Joint Bushings for Track Joint Assemblies," filed Aug. 15, 2014.
(Continued)

*Primary Examiner* — Hau Phan
(74) *Attorney, Agent, or Firm* — Finnegan, Henderson, Farabow, Garrett & Dunner, LLP

(57) ABSTRACT

Disclosed are various exemplary embodiments of a track joint assembly. In one exemplary embodiment, the track joint assembly may include a first link having a first bore. The track joint assembly may also include a second link having a second bore. Additionally, the track joint assembly may include a pin positioned at least partially within the first bore. The track joint assembly may also include an inner bushing positioned coaxially around the pin, and at least partially within the second bore. In addition, the track joint assembly may include an outer bushing positioned coaxially around the inner bushing. The track joint assembly may also include a seal assembly positioned between the first link and the second link to form a hermetic seal between the first link and the second link.

20 Claims, 11 Drawing Sheets

(58) Field of Classification Search
USPC .............. 305/104, 100, 102, 202, 157, 195
See application file for complete search history.

(56) References Cited

U.S. PATENT DOCUMENTS

| | | |
|---|---|---|
| 3,622,165 A | 11/1971 | Hatch |
| 3,851,932 A | 12/1974 | Story et al. |
| 3,909,076 A | 9/1975 | Kato |
| 4,150,856 A | 4/1979 | Hakkenberg et al. |
| 4,204,716 A | 5/1980 | Baylor |
| 4,274,682 A | 6/1981 | Livesay |
| 4,324,437 A | 4/1982 | Narang |
| 4,331,339 A | 5/1982 | Reinsma |
| 4,618,190 A | 10/1986 | Garman |
| 4,693,617 A | 9/1987 | Roemer |
| 5,069,509 A | 12/1991 | Johnson et al. |
| 5,175,999 A | 1/1993 | Hara |
| 5,183,318 A | 2/1993 | Taft |
| 5,257,858 A | 11/1993 | Taft |
| 5,390,997 A | 2/1995 | Nakaishi et al. |
| 5,511,869 A * | 4/1996 | Edwards ............ B62D 55/092 305/100 |
| 5,836,699 A | 11/1998 | Back |
| 5,853,233 A | 12/1998 | Turner |
| 5,994,664 A | 11/1999 | Anderton et al. |
| 6,024,495 A | 2/2000 | Loos |
| 6,045,200 A | 4/2000 | Anderton et al. |
| 6,142,588 A | 11/2000 | Ketting et al. |
| 6,206,491 B1 | 3/2001 | Hisamatsu |
| 6,371,577 B1 * | 4/2002 | Hasselbusch .......... B62D 55/08 305/100 |
| 6,382,742 B1 * | 5/2002 | Hasselbusch .......... B62D 55/21 305/100 |
| 6,565,161 B2 | 5/2003 | Anderton |
| 6,644,430 B2 | 11/2003 | Harer |
| 6,739,680 B2 | 5/2004 | Hasselbusch et al. |
| 6,883,876 B2 | 4/2005 | Yamamoto et al. |
| 6,886,323 B2 | 5/2005 | Yamamoto |
| 6,938,732 B2 | 9/2005 | Garbagnati |
| 7,240,973 B2 | 7/2007 | Takayama |
| 7,347,513 B2 | 3/2008 | Johannsen et al. |
| 7,597,410 B2 | 10/2009 | Mulligan et al. |
| 7,850,256 B2 | 12/2010 | Mulligan |
| 7,887,240 B2 | 2/2011 | Marathe |
| 7,959,239 B2 | 6/2011 | Diekevers et al. |
| 8,025,346 B2 | 9/2011 | Livesay |
| 8,070,241 B2 | 12/2011 | Mulligan |
| 8,075,192 B2 | 12/2011 | Yamamoto et al. |
| 8,336,970 B2 | 12/2012 | Johannsen |
| 8,657,498 B2 | 2/2014 | Cooley |
| 8,905,640 B2 | 12/2014 | Snyder |
| 9,045,179 B2 | 6/2015 | Giusti |
| 9,045,180 B2 * | 6/2015 | Brewer ................ B62D 55/202 |
| 9,061,720 B2 * | 6/2015 | Giusti .................. B62D 55/088 |
| 9,126,645 B2 | 9/2015 | Hasselbusch |
| 2002/0145336 A1 | 10/2002 | Bottom |
| 2003/0000747 A1 | 1/2003 | Sugiyama et al. |
| 2006/0181151 A1 | 8/2006 | Wodrich |
| 2009/0108541 A1 | 4/2009 | Beardsley et al. |
| 2009/0142011 A1 | 6/2009 | Yamamoto et al. |
| 2009/0243384 A1 | 10/2009 | Diekevers et al. |
| 2010/0007206 A1 | 1/2010 | Wodrich |
| 2010/0102624 A1 | 4/2010 | Mulligan |
| 2010/0270856 A1 | 10/2010 | Maeda et al. |
| 2011/0049975 A1 | 3/2011 | Mulligan |
| 2011/0079451 A1 | 4/2011 | Clarke et al. |
| 2011/0309672 A1 | 12/2011 | Thorson |
| 2012/0002910 A1 | 1/2012 | Snyder et al. |
| 2012/0019055 A1 | 1/2012 | Giusti |
| 2012/0267859 A1 | 10/2012 | Liang et al. |
| 2012/0267947 A1 | 10/2012 | Johannsen et al. |
| 2013/0002010 A1 | 1/2013 | Hasselbusch et al. |

FOREIGN PATENT DOCUMENTS

| | | |
|---|---|---|
| EP | 1 069 032 A2 | 1/2001 |
| EP | 1 085 138 A2 | 1/2001 |
| EP | 1 591 350 A2 | 11/2005 |
| EP | 1775204 | 4/2007 |
| EP | 2 269 898 A2 | 1/2011 |
| EP | 2514657 | 10/2012 |
| JP | 61-046772 A | 3/1966 |
| JP | 58-093678 A | 6/1983 |
| JP | 59-114169 | 7/1984 |
| JP | 11-348844 A | 12/1999 |
| JP | 2003-127919 A | 5/2003 |
| JP | 2009216174 | 9/2009 |
| JP | 5480591 32 | 4/2014 |
| KR | 1020050026223 | 3/2005 |
| WO | 9119634 | 12/1991 |
| WO | WO 9311020 | 6/1993 |
| WO | WO 0029275 | 5/2000 |
| WO | WO 0216060 | 2/2002 |
| WO | WO 2009120593 | 10/2009 |

OTHER PUBLICATIONS

U.S. Appl. No. 14/461,269 of Thorson et al., titled "Track Joint Assemblies and Thrust Rings for Same," filed Aug. 15, 2014.

U.S. Appl. No. 14/461,321 of Kaufman et al., titled "Track Joint Assemblies," filed Aug. 15, 2014.

U.S. Appl. No. 14/461,304 of Brewer et al., filed Aug. 15, 2014, titled "Track Joint Assemblies,".

U.S. Appl. No. 14/461,249 of Diekevers et al., filed Aug. 15, 2014, titled "Track Joint Assemblies,".

International Search Report and Written Opinion mailed Dec. 30, 2014, in PCT/US2014/052519 filed Aug. 25, 2014 (14 pages).

International Search Report and Written Opinion mailed Dec. 26, 2014, in PCT/US2014/052526 filed Aug. 25, 2014 (10 pages).

International Search Report and Written Opinion mailed Dec. 23, 2014, in PCT/US2014/052536 filed Aug. 25, 2014 (14 pages).

International Search Report and Written Opinion mailed Dec. 23, 2014, in PCT/US2014/052539, filed Aug. 25, 2014 (10 pages).

International Search Report and Written Opinion mailed Dec. 26, 2014, in PCT/US2014/052548 filed Aug. 25, 2014 (10 pages).

International Search Report and Written Opinion mailed Dec. 12, 2014, in PCT/US2014/052556, filed Aug. 25, 2014 (10 pages).

* cited by examiner

TRACK JOINT ASSEMBLIES

CROSS-REFERENCE TO RELATED APPLICATION

This application claims the benefit of U.S. Provisional Patent Application No. 61/871,537, filed Aug. 29, 2013, which is hereby incorporated by reference in its entirety.

TECHNICAL FIELD

The present disclosure relates generally to track assemblies and, more particularly, to track joint assemblies for joining links of the track assemblies.

BACKGROUND

Many earth-working machines, such as, for example, loaders, tractors, and excavators, include tracked undercarriages to facilitate movement of the machines over ground surfaces. Such undercarriages include drive sprockets that rotate track assemblies about one or more idlers or other guiding components to propel the machines over the ground surfaces. Each track assembly includes a pair of parallel chains, each made up of a series of links, joined to each other by pins and/or bushings (the combination of which is sometimes referred to as a cartridge assembly). Due to extreme wear from abrasion and impacts experienced during use, undercarriage maintenance costs often constitute more than one quarter of the total costs associated with operating the earth-working machines.

FIG. 1 provides an example of a prior art cartridge assembly 10 for coupling links, which is disclosed by U.S. Patent Application Publication No. 2012/0267947 by Johannsen et al. As shown, cartridge assembly 10 includes a pin 12 accommodated within an inner bushing 14, which is, in turn, accommodated within an outer bushing 16. End portions 17a, 17b of inner bushing 14 are surrounded by inserts 19a, 19b, and end portions 21a, 21b of pin 12 are surrounded by collars 23a, 23b. Pin 12 has a lubricant channel 25, which serves as a reservoir for lubricant and delivers lubricant to a gap between pin 12 and inner bushing 14, and to a gap between inner bushing 14 and outer hushing 16. The lubricant is retained by seals 27a, 27b positioned between outer bushing 16 and inserts 19a, 19b, and by seals 29a, 29b positioned between inserts 19a, 19b and collars 23a, 23b.

Cartridge assembly 10 may provide certain benefits that are particularly important for some applications. However, it may have certain drawbacks. For example, manufacturing pin 12 to include channel 25 may be complicated and costly. As another example, manufacturing links large enough to accommodate inserts 19a, 19b and collars 23a, 23b (as opposed to just pin 12 and inner bushing 14) may require an excessive amount of material. The disclosed embodiments may help solve these problems.

SUMMARY

One disclosed embodiment relates to a track joint assembly. The track joint assembly may include a first link having a first bore. The track joint assembly may also include a second link having a second bore. Additionally, the track joint assembly may include a pin positioned at least partially within the first bore. The track joint assembly may also include an inner bushing positioned coaxially around the pin, and at least partially within the second bore. In addition, the track joint assembly may include an outer bushing positioned coaxially around the inner bushing. The track joint assembly may also include a seal assembly positioned between the first link and the second link to form a hermetic seal between the first link and the second link.

Another disclosed embodiment relates to a track joint assembly. The track joint assembly may include a first link having a first bore. The track joint assembly may also include a second link having a second bore. Additionally, the track joint assembly may include a pin positioned at least partially within the first bore. The track joint assembly may also include an inner bushing positioned coaxially around the pin, and at least partially within the second bore. In addition, the track joint assembly may include an outer bushing positioned coaxially around the inner bushing. The track joint assembly may also include a seal assembly positioned between the first link and the second link. The seal assembly may contact the second link at a portion of the second link including material having a different wear resistance than material of another portion of the second link.

A further disclosed embodiment relates to a track joint assembly. The track joint assembly may include a first link having a first bore. The track joint assembly may also include a second link having a second bore. In addition, the track joint assembly may include a pin positioned at least partially within the first bore. The track joint assembly may also include an inner bushing positioned coaxially around the pin, and at least partially within the second bore. Additionally, the track joint assembly may include an outer bushing positioned coaxially around the inner bushing. The second link may include a sealing portion surrounding an axial end of the inner bushing. The sealing portion may include material having a different wear resistance than material of another portion of the second link.

DETAILED DESCRIPTION

Figure 1:
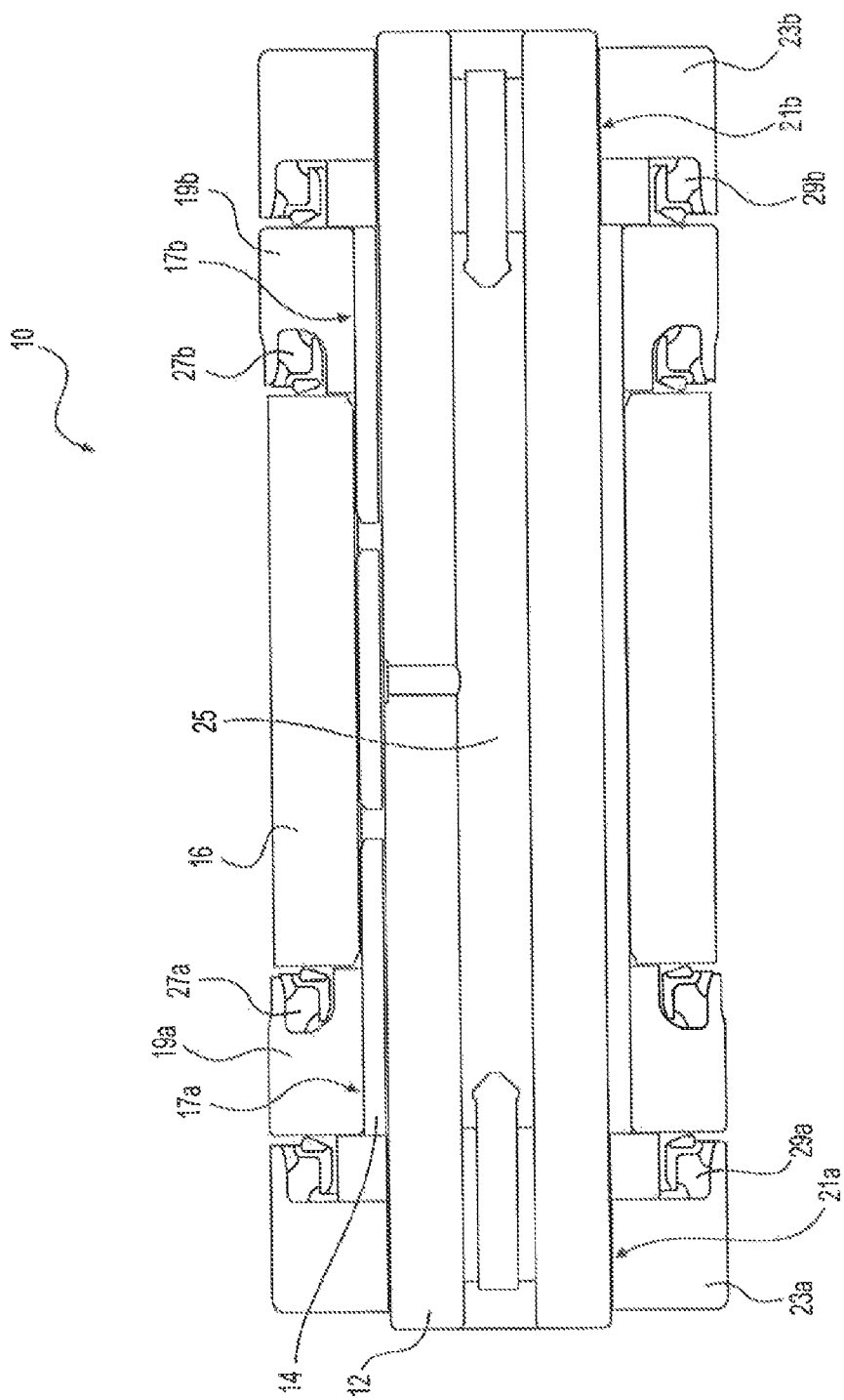
FIG. 1 is a view of a prior art cartridge assembly.
Figure 2:
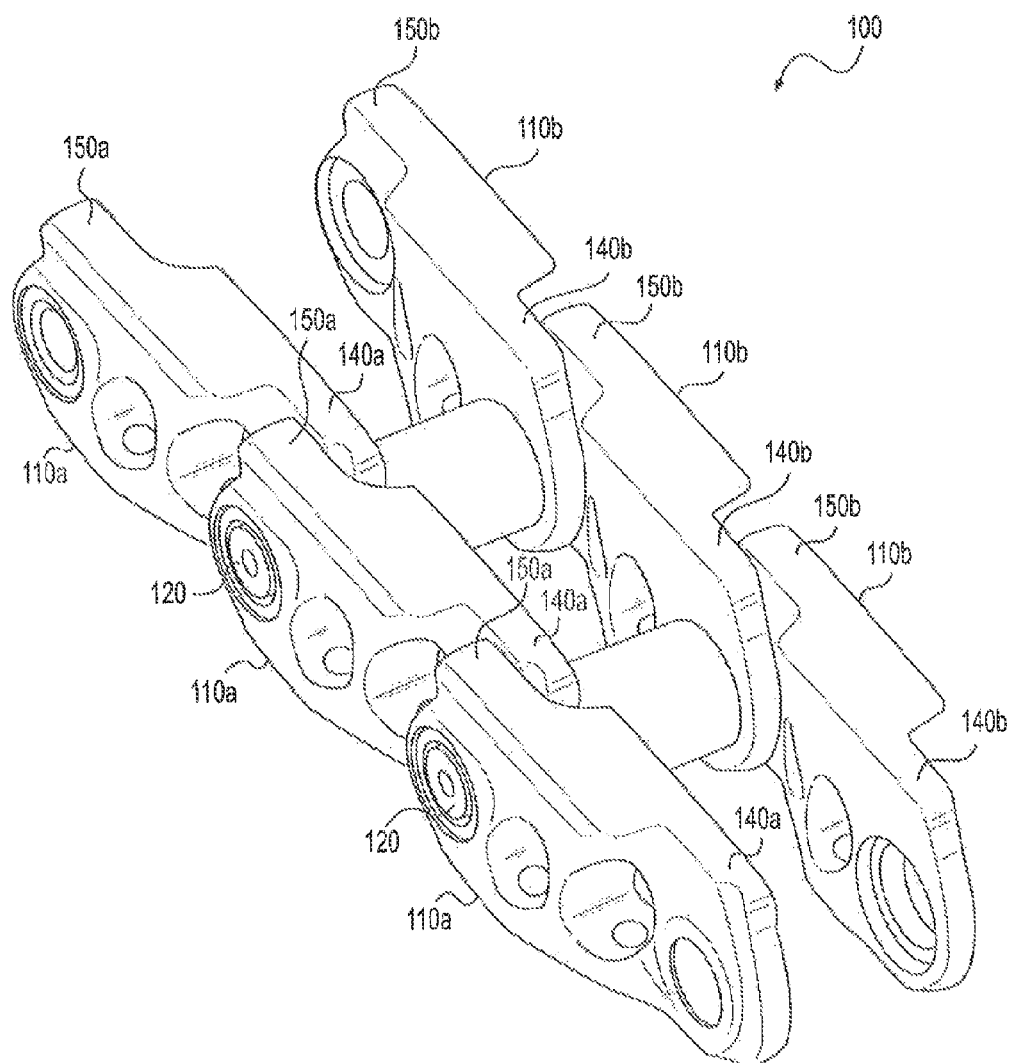
FIG. 2 is a perspective view of a track assembly according to the present disclosure.

FIG. 2 illustrates an exemplary track assembly 100 for a track-type machine. For example, the track-type machine may be a loader, a tractor, an excavator, a tank, or another mobile machine having track-type traction devices. When operated, a drive sprocket of the track-type machine (not shown) may rotate track assembly 100 about one or more idlers or other guiding components (not shown) to facilitate movement of the track-type machine.

Track assembly 100 may include a series of links 110a joined to each other and to a series of links 110b by laterally disposed pins 120. As shown, links 110a and 110b may be offset links. That is, they may have inwardly offset ends 140a, 140b and outwardly offset ends 150a, 150b. An inwardly offset end 140a, 140b of each link 110a, 110b may be joined to an outwardly offset end 150a, 150b of each adjacent link 110a, 110b. In addition, an inwardly offset end 140a of each link 110a may be joined to an inwardly offset end 140b of an opposing link 110b, and an outwardly offset end 150a of each link 110a may be joined to an outwardly offset end 150b of an opposing link 110b. It should be understood, however, that links 110a and 110b need not be offset links. Rather, in some embodiments, links 110a and 110b may be inner links and outer links. In such embodiments, both ends of each opposing pair of inner links would be sandwiched between ends of opposing outer links, as is known in the art.

Figure 3:
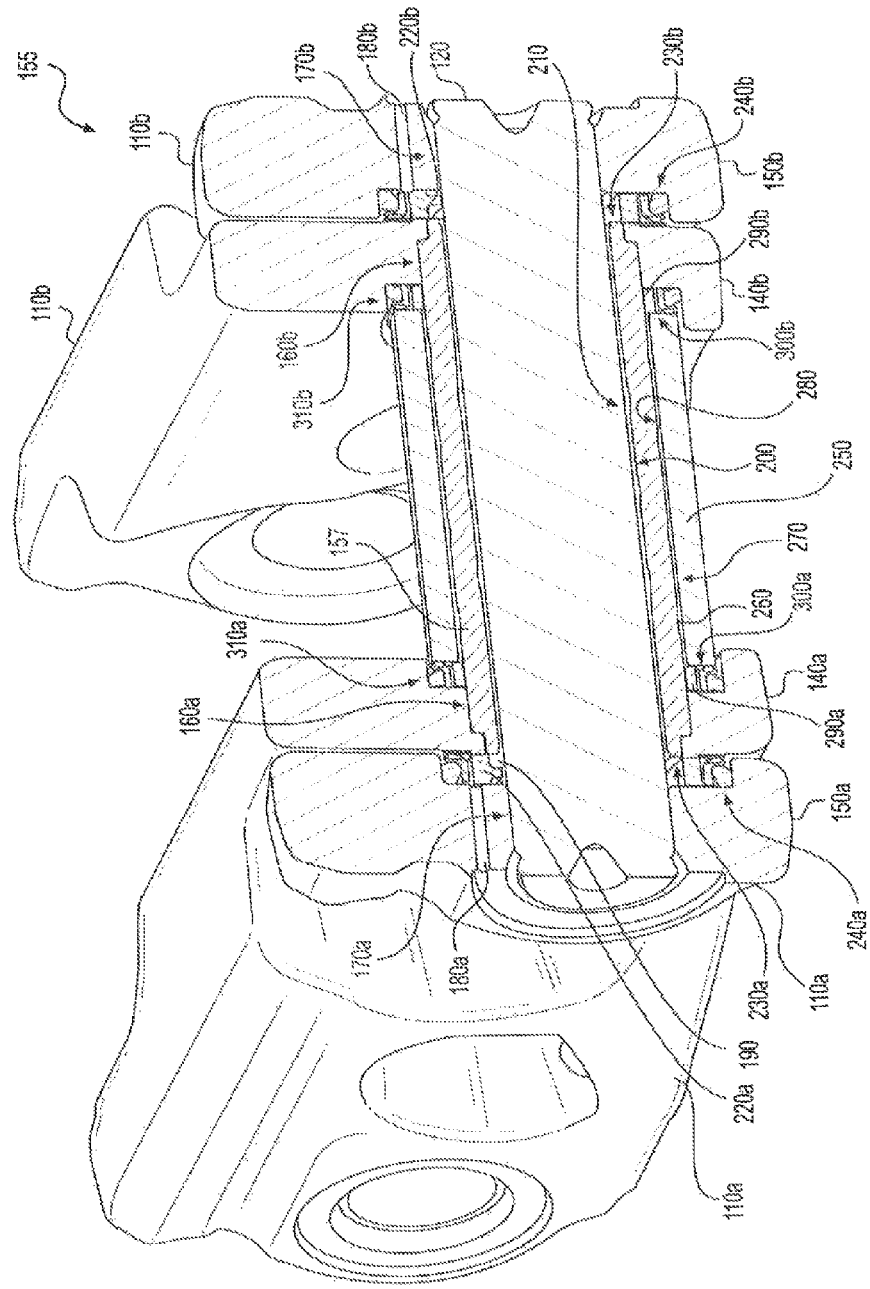
FIG. 3 is a cutaway view of a track joint assembly of the track assembly of FIG. 2.
Figure 4:
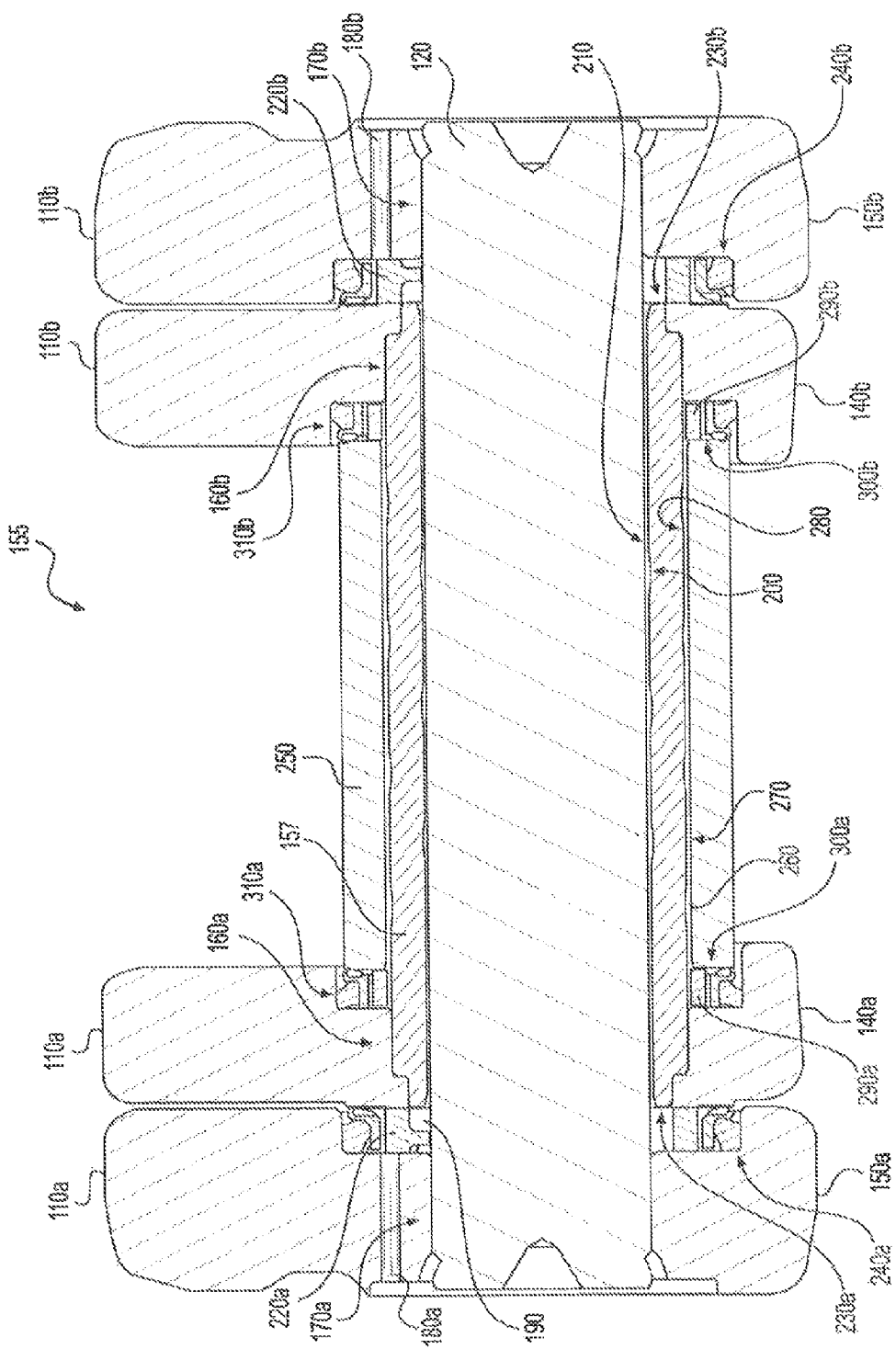
FIG. 4 is a cross-section of the track joint assembly of FIG. 3.

Referring to FIGS. 3 and 4, an individual track joint assembly 155 of track assembly 100 may include two links 110a joined to two links 110b. As shown, inwardly offset ends 140a, 140b of links 110a, 110b may be secured to a joint bushing 157, which may be at least partially positioned within bushing bores 160a, 160b of offset ends 140a, 140b. Similarly, outwardly offset ends 150a, 150b of links 110a, 110b may be secured to a pin 120, which may be at least partially positioned within pin bores 170a, 170b of offset ends 150a, 150b. For example, the securing may be by way of press-fits. Specifically, bushing 157 may be press-fit into bushing bores 160a, 160b, and pin 120 may be press-fit into pin bores 170a, 170b. Alternatively, the securing may be by way of welds, snap rings, or other mechanisms known in the art.

As shown, bushing 157 may be positioned coaxially around pin 120, and may rotate relative to pin 120, allowing inwardly offset ends 140a, 140b to pivot relative to outwardly offset ends 150a, 150b as track assembly 100 rotates. In order to facilitate such rotation, one or both of bushing 157 and pin 120 may be coated with diamond like carbon or electroless nickel, or may be carburized, nitrided, or polished to reduce friction between bushing 157 and pin 120. Alternatively or additionally, a lubricating fluid may be situated between bushing 157 and pin 120.

The lubricating fluid may be added through openings 180a, 180b in links 110a, 110b, and may be contained in a lubricating fluid cavity 190 at least partially defined by a generally cylindrical inner surface 200 of inner bushing 157 and a generally cylindrical outer surface 210 of pin 120 facing surface 200. Unlike the prior art cartridge assembly discussed above, lubricating fluid cavity 190 may not extend into an interior cavity of pin 120, as pin 120 may be solid. Since pin 120 may not contain lubricating fluid, lubricating fluid cavity 190 may extend into and be at least partially defined by one or more recesses in surface 200 or surface 210. Alternatively or additionally, lubricating fluid cavity 190 may extend into and be at least partially defined by thrust rings 220a, 220b positioned at axial ends 230a, 230b of bushing 157. Thrust rings 220a, 220b may transmit axial load between adjacent links 110a, 110b, and may limit axial load on seal assemblies 240a, 240b, which may be positioned radially outward of thrust rings 220a, 220b and form hermetic seals between adjacent links 110a, 110b to retain the lubricating fluid in lubricating fluid cavity 190.

Still referring to FIGS. 3 and 4, in some embodiments, track joint assembly 155 may also include an outer bushing 250, which may be positioned coaxially around bushing 157 (making bushing 157 an inner bushing) to engage a drive sprocket (not shown) that rotates track assembly 100. Outer bushing 250 may rotate relative to inner bushing 157 when it engages the drive sprocket, reducing wear on outer bushing 250 caused by sliding motion between outer bushing 250 and the drive sprocket. Such rotation may be facilitated by coating one or both of outer bushing 250 and inner bushing 157 with diamond like carbon or electroless nickel, or by carburizing, nitriding, or polishing one or both of outer bushing 250 and inner bushing 157 to reduce friction between outer bushing 250 and inner bushing 157. Alternatively or additionally, lubricating fluid may be situated between outer bushing 250 and inner bushing 157. This lubricating fluid may be the same as or different from the lubricating fluid situated between inner bushing 157 and pin 120.

The lubricating fluid may be added during assembly of track joint assembly 155, and may be contained in a lubricating fluid cavity 260 at least partially defined by a generally cylindrical inner surface 270 of outer bushing 250 and a generally cylindrical outer surface 280 of inner bushing 157 facing surface 270. Lubricating fluid cavity 260 may be isolated from lubricating fluid cavity 190 so that a leak in lubricating fluid cavity 260 does not impact lubricating fluid cavity 190 (and vice versa). Lubricating fluid cavity 260 may extend into and be at least partially defined by one or more recesses in surface 270 or surface 280. Alternatively or additionally, lubricating fluid cavity 260 may extend into and be at least partially defined by thrust rings 290a, 290b, which may be disposed in bushing bores 160a, 160b, and which may be positioned at axial ends 300a, 300b of outer bushing 250 and coaxially around inner bushing 157. Thrust rings 290a, 290b may limit axial load on seal assemblies 310a, 310b, which may form hermetic seals between outer bushing 250 and links 110a, 110b to retain the lubricating fluid in lubricating fluid cavity 260.

Figure 5:
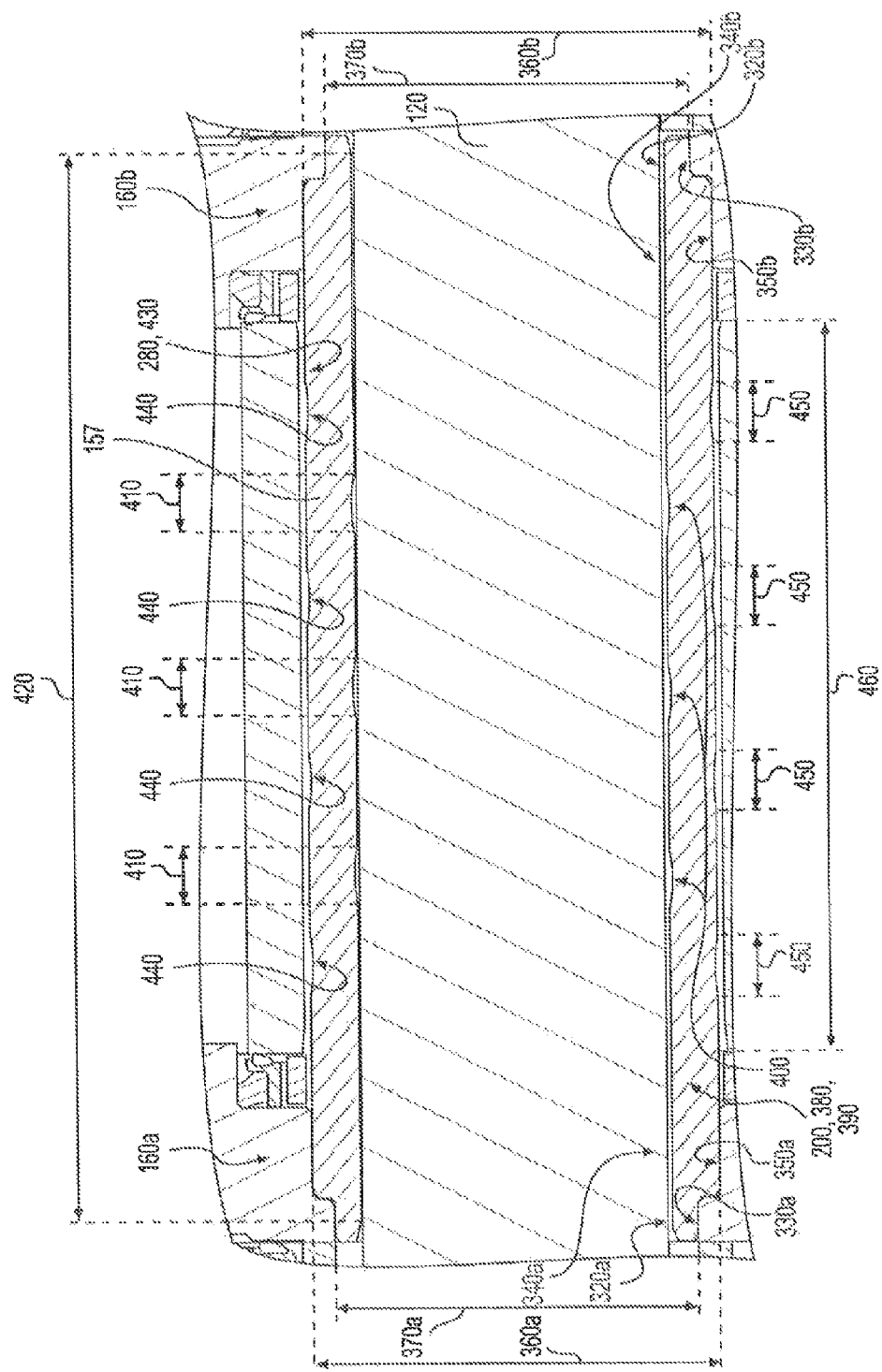
FIG. 5 is an enlarged view of a portion of FIG. 4.

As shown in FIG. 5 and discussed above, bushing 157 may be press-fit into bushing bores 160a, 160b. In particular, axial end portions 320a, 320b of bushing 157 may be disposed in and press-fit into outer portions 330a, 330b of bushing bores 160a, 160b. Additionally, axial end-adjacent portions 340a, 340b of bushing 157 may be disposed in and press-fit into central portions 350a, 350b of bushing bores 160a, 160b. Thus, axial end portions 320a, 320b may contact outer portions 330a, 330b, and axial end-adjacent portions 340a, 340b may contact central portions 350a, 350b. In some embodiments, outer diameters 360a, 360b of end-adjacent portions 340a, 340b may be larger than outer diameters 370a, 370b of end portions 320a, 320b. Accordingly, outer portions 330a, 330b may have different diameters than central portions 350a, 350b to account for the differences between diameters 360a, 360b and 370a, 370b). In other embodiments, however, outer diameters 360a, 360b of end-adjacent portions 340a, 340b may be the same as outer diameters 370a, 370b of end portions 320a, 320b, in which case outer portions 330a, 330b might have the same diameters as central portions 350a, 350b.

Referring again to FIG. 5, inner surface 200 of bushing 157 may include a generally cylindrical inner surface 380 defining a bore 390. Pin 120 may be positioned at least partially within bore 390 and its motion may thus be constrained by surface 380. Accordingly, surface 380 may be a bearing surface. As shown, inner surface 380 may include three valley-shaped recesses 400, each extending into and along a circumference of bushing 157, and a sum of lengths 410 of recesses 400, in an axial direction of bushing 157, may be approximately 27% of a length 420 of surface 380. It should be understood, however, that inner surface 380 may include a different number of recesses or differently sized recesses. For example, inner surface 380 may include between one and twenty recesses 400, and the sum of lengths 410 may be between approximately 5% and approximately 75% of length 420. It is contemplated, however, that, by using a plurality of recesses 400 (as opposed to a single larger recess 400), the structural integrity of bushing 157 may be maintained. It should also be understood that inner surface 380 may include differently positioned or shaped recesses. For example, inner surface 380 may include valley-shaped recesses extending along the axial direction of bushing 157. Alternatively, inner surface 380 may include helical recesses extending along both circumferential and axial directions of bushing 157.

Outer surface 280 of bushing 157 may include a generally cylindrical outer surface 430, which may constrain motion of outer bushing 250. Thus, surface 430 may be a bearing surface. As shown, outer surface 430 may include a different number of recesses than inner surface 380, and its recesses may be offset, in the axial direction of bushing 157, relative to those of inner surface 380 in order to avoid compromising bushing 157's structural integrity. Specifically, outer surface 430 may include four valley-shaped recesses 440, each extending into and along a circumference of bushing 157, and a sum of lengths 450 of recesses 440, in the axial direction of bushing 157, may be approximately 37% of a length 460 of surface 430. It should be understood, however, that outer surface 430 may include a different number of recesses or differently sized recesses. For example, outer surface 430 may include between one and twenty recesses 440, and the sum of lengths 450 may be between approximately 7% and approximately 38% of length 460. It is contemplated, however, that, by using a plurality of recesses 440 (as opposed to a single larger recess 440), the structural integrity of bushing 157 may be maintained. It should also be understood that outer surface 430 may include differently positioned or shaped recesses. For example, outer surface 430 may include valley-shaped recesses extending along the axial direction of bushing 157. Alternatively, outer surface 430 may include helical recesses extending along both circumferential and axial directions of bushing 157. In yet another alternative, outer surface 430 may include recesses that are aligned with (as opposed to offset relative to) those of inner surface 380.

Figure 6:
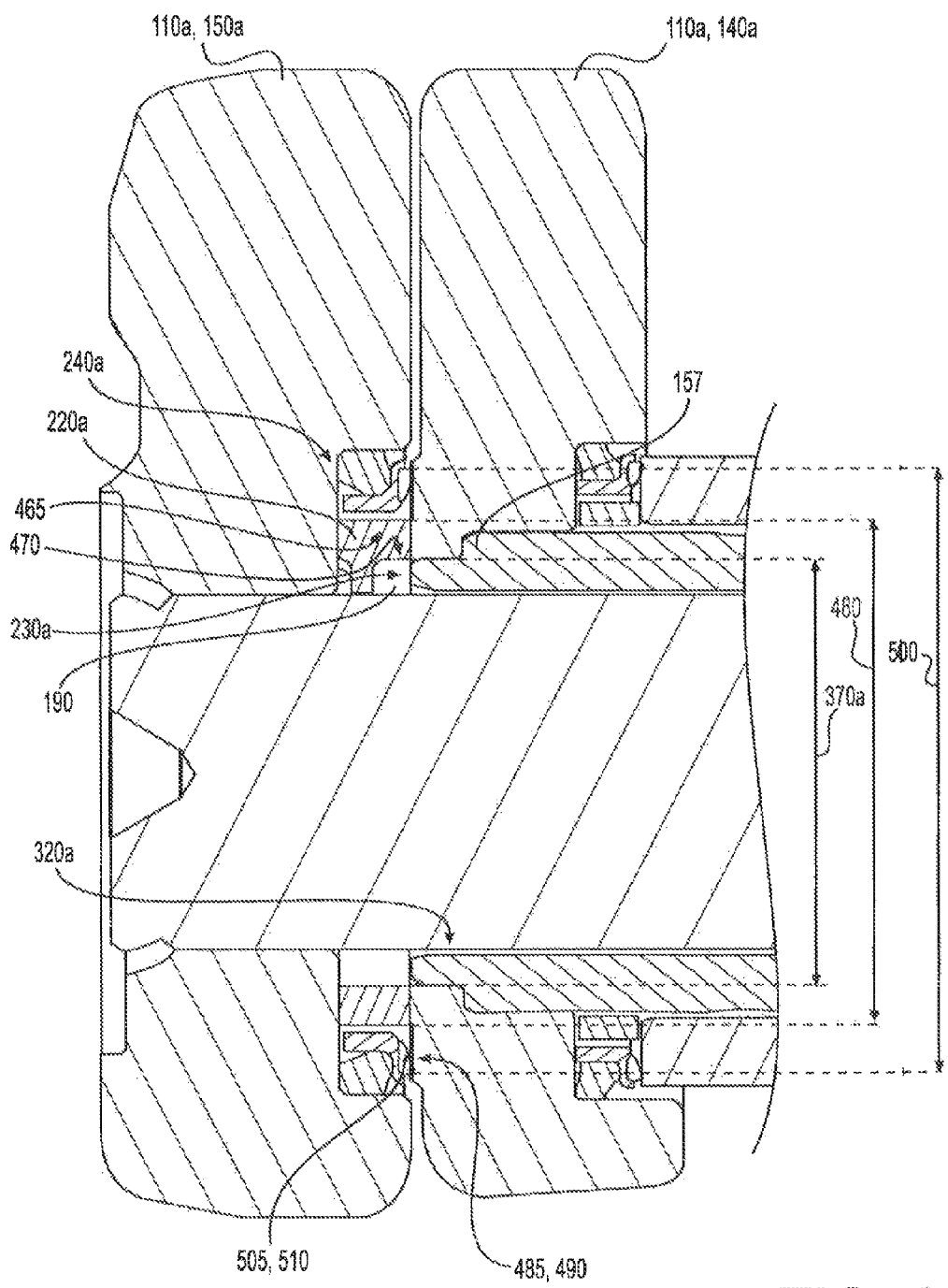
FIG. 6 is another enlarged view of a portion of FIG. 4.

As shown in FIG. 6 and discussed above, thrust ring 220a may be positioned at axial end 230a of bushing 157. Thrust ring 220a may include a generally cylindrical outer surface 465, which may support seal assembly 240a. In addition, thrust ring 220a may include a generally cylindrical inner surface 470, which may at least partially define lubricating fluid cavity 190. As shown, an outer diameter 480 of outer surface 465 (and thus thrust ring 220a) may be larger than outer diameter 370a of axial end portion 320a of inner bushing 157. Specifically, outer diameter 480 may be approximately 1.16 times outer diameter 370a. Alternatively, outer diameter 480 may be another size. For example, outer diameter 480 may be between approximately 1.1 and approximately 2.0 times outer diameter 370a.

Thrust ring 220a's larger diameter may ensure that seal assembly 240a contacts only links 110a, not bushing 157. Specifically, seal assembly 240a may contact a sealing portion 485 of link 110a at a seal-link interface 490. As shown, an outer diameter 500 of seal-link interface 490 may be approximately 1.20 times outer diameter 370a of axial end portion 320a of inner bushing 157. Alternatively, outer diameter 500 may be another size. For example, outer diameter 500 may be between approximately 1.05 and approximately 2.5 times outer diameter 370a.

Sealing portion 485 may include a sealing surface 505 of inwardly offset end 140a of link 110a that faces outwardly offset end 150a of adjacent link 110a. It may be annular and surround axial end 230a of axial end portion 320a, and may include a different material from other portions of link 110a. That is, it may have different material properties from other portions of link 110a. The different material may have a different wear resistance than material of the other portions, and may better resist wear and corrosion resulting from sealing portion 485's contact with seal assembly 240a. For example, the different material may be an electroless nickel coating, a nitride coating, or a carborized coating. In some embodiments, the different material may be a washer 510 attached to link 110a. For example, washer 510 may be press-fit into another portion of link 110a, welded to the other portion, fastened to the other portion with an adhesive, or held in the other portion by an annular biasing member positioned at an inner diameter or an outer diameter of washer 510. In other embodiments, the different material may be clad (e.g., laser clad) to the material of the other portion of link 110a. Alternatively, the different material may be a laser hardened or a thermal sprayed material. In yet another alternative, the different material may be a thin film coating of, for example, chromium nitride, amorphous diamondlike carbon, or tetrahedral amorphous carbon.

Figure 7:
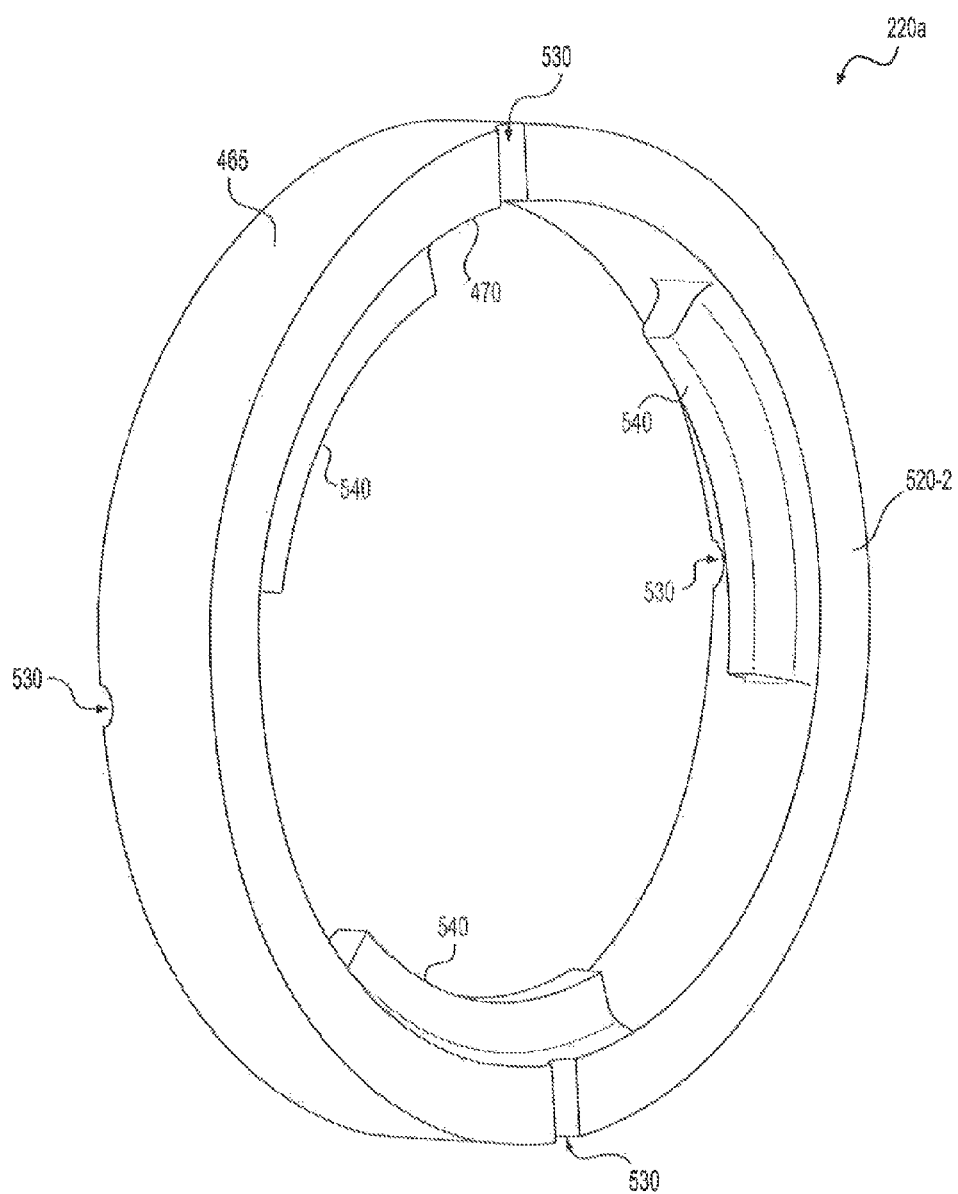
FIG. 7 is a perspective view of a thrust ring of the track joint assembly of FIG. 3.
Figure 8:
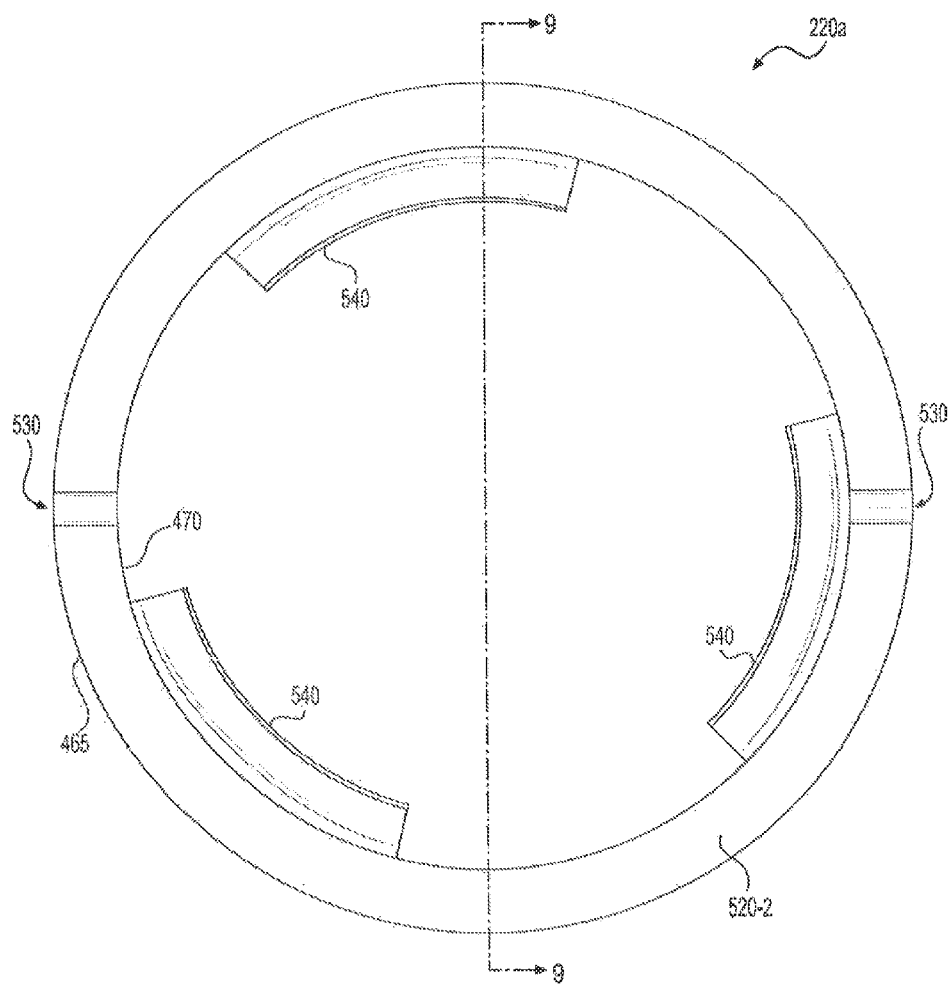
FIG. 8 is a side view of the thrust ring of FIG. 7.
Figure 9:
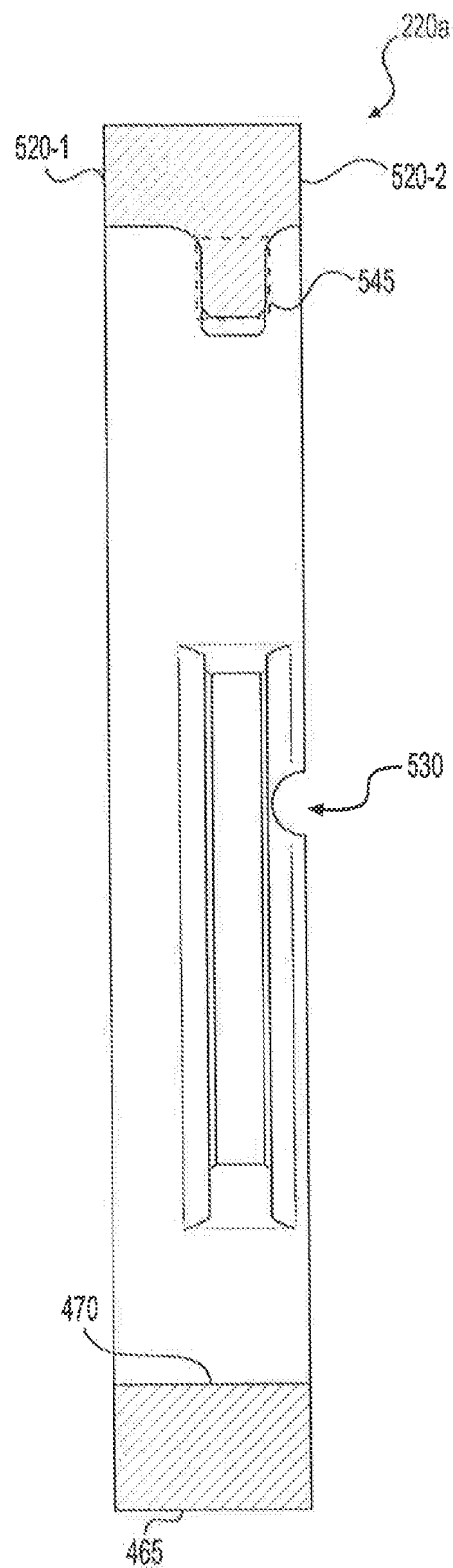
FIG. 9 is a cross-section of the thrust ring of FIG. 7.

Referring to FIGS. 7-9, thrust ring 220a may include axial ends 520-1 and 520-2 connecting outer surface 465 of thrust ring 220a to inner surface 470 of thrust ring 220a. As shown, each of axial ends 520-1 and 520-2 may include two recesses 530, which may extend from outer surface 465 to inner surface 470 to facilitate lubricating fluid flow between an exterior of thrust ring 220a and an interior of thrust ring 220a. Alternatively, axial ends 520-1 and 520-2 may include another number of recesses. For example, in some embodiments, axial end 520-1 may include a different number of recesses than axial end 520-2.

As shown in FIGS. 7-9, inner surface 470 of thrust ring 220a may include three protrusions 540, all extending along a circumference of thrust ring 220a and toward a central axis of thrust ring 220a. Protrusions 540 may have approximately rectangular cross-sections 545, and may be offset, in an axial direction of thrust ring 220a, from a center of thrust ring 220a, as best shown in FIG. 9. Some embodiments, however, may include different configurations of protrusions. For example, some embodiments may have only one protrusion, which may or may not extend along an entire circumference of thrust ring 220a. Other embodiments may have a plurality of protrusions, but such protrusions may be shaped or positioned differently than protrusions 540. For example, instead of having approximately rectangular cross-sections, they may have approximately U-shaped or V-shaped protrusions, and they may or may not be offset from the center of thrust ring 220a.

Figure 10:
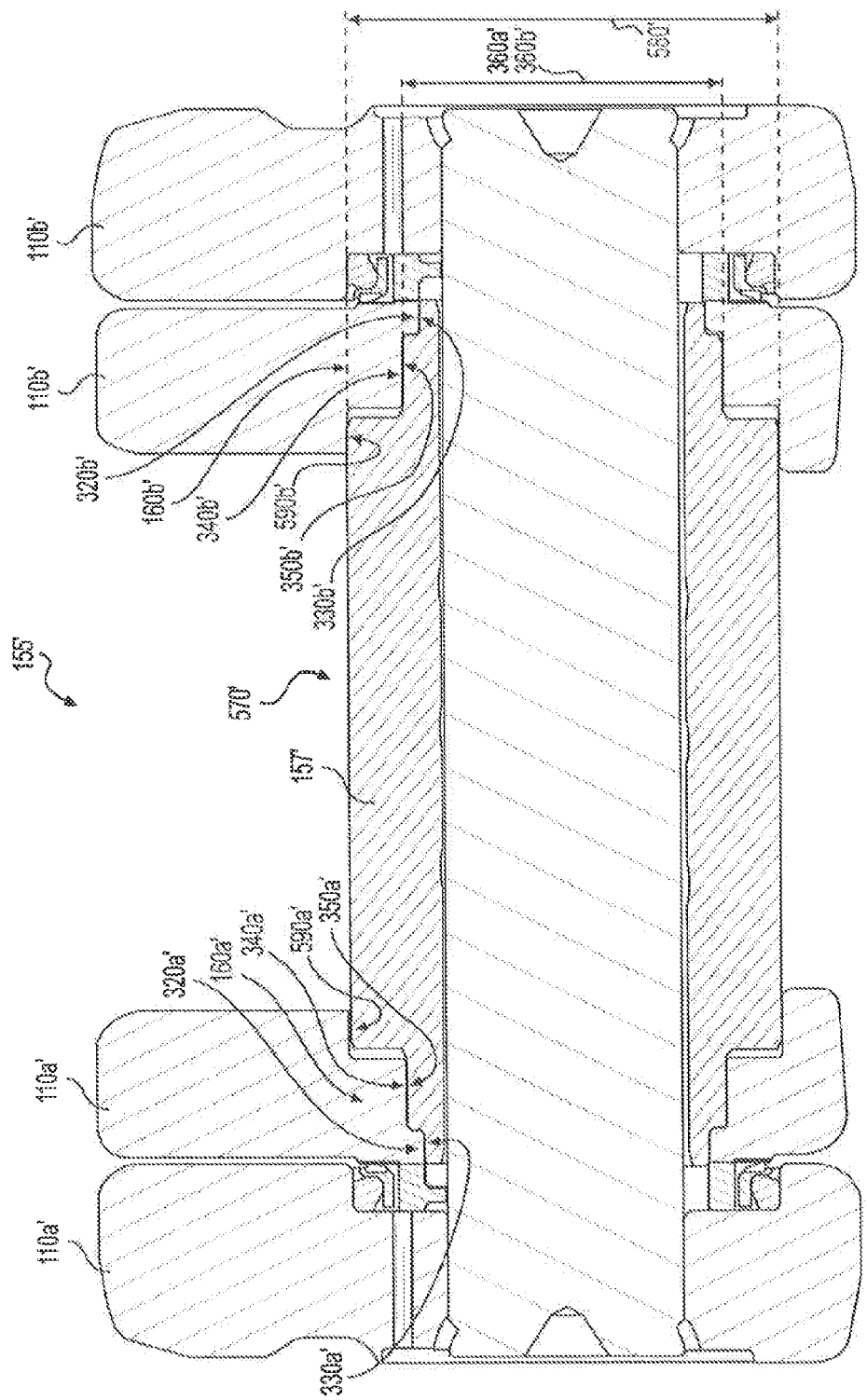
FIG. 10 is a cross-section of another track joint assembly according to the present disclosure.

FIG. 10 illustrates another embodiment of a track joint assembly 155' including a different bushing configuration. Instead of having inner bushing 157 and outer bushing 250, track joint assembly 155' may include only a single bushing 157'. Otherwise, track joint assembly 155' may be identical to track joint assembly 155.

Bushing 157' may be similar to bushing 157. Accordingly, only the ways in which bushing 157' differs from bushing 157 will be described. Bushing 157' may include a middle portion 570' between axial end-adjacent portions 340a', 340b'. Thus, middle portion 570' may be separated from axial end portions 320a', 320b' by axial end-adjacent portions 340a', 340b'. Middle portion 570' may have an outer diameter 580' that is larger than outer diameters 360a', 360b' of end-adjacent portions 340a', 340b' to maximize the amount of wear that middle portion 570' may sustain as a result of engagement with the drive sprocket. For example, outer diameter 580' may be approximately 1.49 times outer diameters 360a', 360b'. It should be understood, however, that outer diameter 580' may be another size. For example, outer diameter 580' may be between approximately 1.25 and approximately 2.00 times outer diameters 360a', 360b'. In some embodiments, middle portion 570' may be positioned at least partially within inner portions 590a', 590b' of bushing bores 160a', 160b'. In other embodiments, middle portion 570' may not be positioned at least partially within inner portions 590a', 590b'.

Figure 11:
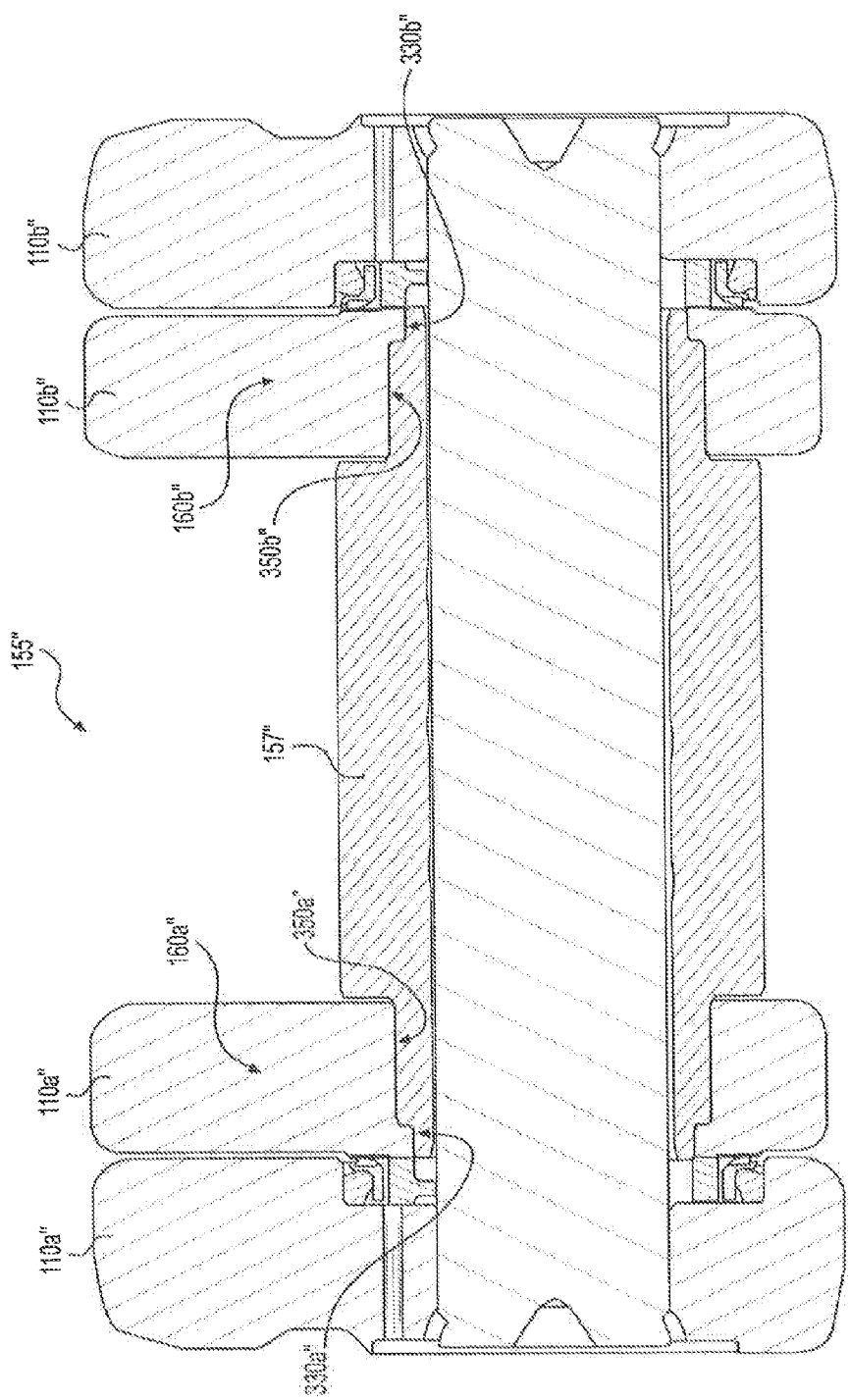
FIG. 11 is a cross-section of yet another track joint assembly according to the present disclosure.

FIG. 11 illustrates yet another embodiment of track joint assembly 155" including different bushing and link configurations. Like track joint assembly 155', instead of having inner bushing 157 and outer bushing 250, track joint assembly 155" may include only a single bushing 157". Additionally, instead of having links 110a, 110b, track joint assembly 155" may include links 110a" and 110b". Bushing 157" may be similar to bushing 157', and links 110a", 110b" may be similar to links 110a', 110b' (and thus links 110a, 110b). Links 110a", 110b" may differ from links 110a', 110b' only in that they include bushing bores 160a", 160b" having only two portions (outer portions 330a", 330b" and central portions 350a", 350b") instead of three portions (outer portions 330a', 330b', central portions 350a', 350b', and inner portions 590a', 590b'). And bushing 157" may differ from bushing 157' only in that middle portion 570" may not be positioned at least partially within inner portions of bushing bores 160a", 160b". Otherwise, track joint assembly 155" may be identical to track joint assemblies 155 and 155'.

The components of track joint assemblies 155, 155', 155" may be constructed of various materials. In some embodiments, links 110a, 110b, 110a', 110b', 110a", 110b"; bushings 157, 157', 157"; bushings 250; thrust rings 220a, 220b; and thrust rings 290a, 290b may be constructed of metal. For example, each of these components may be constructed of a ferrous metal, such as steel or iron.

The configuration of track joint assemblies 155, 155', 155" is not limited to the configurations discussed above and shown in the drawings. For example, outer surface 210 of pin. 120 may include recesses instead of inner surface 200 of bushing 157. Such recesses may be similar to recesses 440 in outer surface 280 of hushing 157. As another example, inner surface 270 of outer bushing 250 may include recesses instead of outer surface 280 of bushing 157. Such recesses may be similar to recesses 400 in inner surface 200 of bushing 157.

INDUSTRIAL APPLICABILITY

The disclosed track joint assemblies may be applicable to track-type machines, such as, for example, loaders, tractors, excavators, and tanks, and may facilitate movement of the machines. The disclosed track joint assemblies may have various advantages over prior art track joint assemblies. For example, the disclosed track joint assemblies may be stronger and more durable than prior art track joint assemblies. In addition, manufacturing the disclosed track joint assemblies may cost less than manufacturing prior art track joint assemblies, and may require less material than manufacturing prior art track joint assemblies. Specific advantages of the disclosed track joint assemblies will now be described.

Track joint assembly 155 may include direct connections between links 110a, 110b that strengthen and improve the durability of track joint assembly 155. Specifically, inwardly offset ends 140a, 140b of links 110a, 110b may be directly connected by being secured to bushing 157. Likewise, outwardly offset ends 150a, 150b of links 110a, 110b may be directly connected by being secured to pin 120. Such direct connections between links 110a, 110b may strengthen and improve the durability of track joint assembly 155 by reducing its susceptibility to vibrations and impacts.

Track joint assembly 155 may be configured to facilitate rotation of bushing 157 relative to pin 120 even when pin 120 is solid (and thus capable of being manufactured without using costly machining, drilling, or casting processes). In particular, the rotation may be facilitated by coating one or both of bushing 157 and pin 120 with diamond like carbon or electroless nickel, or by carburizing, nitriding, or polishing one or both of bushing 157 and pin 120 to reduce friction between bushing 157 and pin 120. Alternatively or additionally, the rotation may be facilitated by situating a lubricating fluid between bushing 157 and pin 120. Specifically, the lubricating fluid may be added through openings 180a, 180b in links 110a, 110, and may be contained in lubricating fluid cavity 190. Since pin 120 is solid, rather than extending into an interior cavity of pin 120, lubricating fluid cavity 190 may extend into and be at least partially defined by one or more recesses in inner surface 200 of bushing 157 or outer surface 210 of pin 120. Alternatively or additionally, lubricating fluid cavity 190 may extend into and be at least partially defined by thrust rings 220a, 220b.

Track joint assembly 155 may be configured to minimize the total amount of material required to manufacture links 110a, 110b. Such minimization may be achieved by reducing the number of components disposed in bushing bores 160a, 160b of links 110a, 110b. For example, no collar or seal insert needs to be positioned between bushing bore 160a and bushing 157, because the material of sealing portion 485 of link 110a may resist wear and corrosion resulting from sealing portion 485's contact with seal assembly 240a. Thus, inwardly offset ends 140a of links 110a may be secured directly to bushing 157, minimizing the number of components disposed in bushing bore 160a and thus the size of bushing bore 160a and link 110a. For example, the diameter of central portion 350a of hushing bore 160a may be less than 1.49 times the diameter of pin bore 170a. Additionally, the diameter of central portion 350a of bushing bore 160a may be less than 0.87 times the outer diameter of outer bushing 250.

Track joint assemblies 155, 155' and 155" may be optimized for specific applications but include many interchangeable parts to minimize manufacturing costs. For example, track joint assembly 155 may be optimized for high impact applications in which drive sprockets quickly wear down bushings connecting links 110a, 110b, while track joint assemblies 155' and 155" may be optimized for low impact applications in which bushing wear is not a major concern. As discussed above, however, such optimizations only affect a few parts of track joint assemblies 155, 155', and 155". Thus, virtually all of the parts of track joint assemblies 155, 155', and 155" are interchangeable.

It will be apparent to those skilled in the art that various modifications and variations can be made to the disclosed track joint assemblies. Other embodiments will be apparent to those skilled in the art from consideration of the specification and practice of the disclosed track joint assemblies. It is intended that the specification and examples be considered as exemplary only, with a true scope being indicated by the following claims and their equivalents.

What is claimed is:

1. A track joint assembly, comprising:
a first link having a first bore;
a second link having a second bore;
a pin positioned at least partially within the first bore;
an inner bushing positioned coaxially around the pin, and at least partially within the second bore;
an outer bushing positioned coaxially around the inner bushing; and
a first seal assembly positioned in direct contact with opposing surfaces of the first link and the second link to form a hermetic seal between the first link and the second link.

2. The track joint assembly of claim 1, including a thrust ring positioned coaxially around the inner bushing, disposed in the second bore, and supporting a second seal assembly positioned between the second link and the outer bushing to form a hermetic seal between the second link and the outer bushing.

3. The track joint assembly of claim 1, wherein at least one of an outer surface of the inner bushing or an inner surface of the outer bushing facing the outer surface of the inner bushing includes at least one recess at least partially defining a lubricating fluid cavity.

4. The track joint assembly of claim 3, wherein the lubricating fluid cavity contains a lubricating fluid.

5. The track joint assembly of claim 3, wherein the outer surface of the inner bushing includes at least one recess extending into and along a circumference of the inner bushing, and at least partially defining the lubricating fluid cavity.

6. The track joint assembly of claim 5, wherein the at least one recess extending into and along the circumference of the inner bushing is valley-shaped.

7. The track joint assembly of claim 1, wherein the first seal assembly is positioned radially outward of a thrust ring positioned at an axial end of the inner bushing.

8. The track joint assembly of claim 7, wherein the thrust ring has an outer diameter that is larger than an outer diameter of the axial end of the inner bushing.

9. A track joint assembly, comprising:
a first link having a first bore;
a second link having a second bore;
a pin positioned at least partially within the first bore;
an inner bushing positioned coaxially around the pin, the inner bushing having an outer surface that engages with an inner surface of the second bore;
an outer bushing positioned coaxially around the inner bushing; and
a seal assembly positioned between the first link and the second link, and contacting the second link at a portion of the second link including material having a different wear resistance than material of another portion of the second link.

10. The track joint assembly of claim 9, wherein at least one of the outer surface of the inner bushing or an inner surface of the outer bushing facing the outer surface of the inner bushing includes at least one recess at least partially defining a lubricating fluid cavity.

11. The track joint assembly of claim 10, wherein the lubricating fluid cavity contains a lubricating fluid.

12. The track joint assembly of claim 10, wherein the outer surface of the inner bushing includes at least one recess extending into and along a circumference of the inner bushing, and at least partially defining the lubricating fluid cavity.

13. The track joint assembly of claim 12, wherein the at least one recess extending into and along the circumference of the inner bushing is valley-shaped.

14. The track joint assembly of claim 9, wherein the seal assembly is positioned radially outward of a thrust ring positioned at an axial end of the inner bushing.

15. The track joint assembly of claim 14, wherein the thrust ring has an outer diameter that is larger than an outer diameter of the axial end of the inner bushing.

16. A track joint assembly, comprising:
a first link having a first bore;
a second link having a second bore;
a pin positioned at least partially within the first bore;
an inner bushing positioned coaxially around the pin, and at least partially within the second bore; and
an outer bushing positioned coaxially around the inner bushing, wherein:
the second link has a sealing surface surrounding an axial end of the inner bushing; and
the sealing surface of the second link has a different wear resistance than another surface of the second link.

17. The track joint assembly of claim 16, wherein at least one of an outer surface of the inner bushing or an inner surface of the outer bushing facing the outer surface of the inner bushing includes at least one recess at least partially defining a lubricating fluid cavity.

18. The track joint assembly of claim 17, wherein the lubricating fluid cavity contains a lubricating fluid.

19. The track joint assembly of claim 17, wherein the outer surface of the inner bushing includes at least one recess extending into and along a circumference of the inner bushing, and at least partially defining the lubricating fluid cavity.

20. The track joint assembly of claim 19, wherein the at least one recess extending into and along the circumference of the inner bushing is valley-shaped.

* * * * *